United States Patent [19]

Pleasance et al.

[11] 4,308,507
[45] Dec. 29, 1981

[54] ELECTRON BEAM SWITCHED DISCHARGE FOR RAPIDLY PULSED LASERS

[75] Inventors: Lyn D. Pleasance, Livermore; John R. Murray, Danville; Julius Goldhar, Walnut Creek; Laird P. Bradley, Livermore, all of Calif.

[73] Assignee: The United States of America as represented by the United States Department of Energy, Washington, D.C.

[21] Appl. No.: 102,470

[22] Filed: Dec. 11, 1979

[51] Int. Cl.³ .............................................. H01S 3/09
[52] U.S. Cl. ...................... 331/94.5 G; 331/94.5 PE
[58] Field of Search ................. 331/94.5 PE, 94.5 G, 331/94.5 C, 94.5 D

[56] References Cited
U.S. PATENT DOCUMENTS 4,196,399  4/1980  Cason et al. ................. 331/94.5 PE

OTHER PUBLICATIONS

"Ultraviolet-preionized discharge-pumped lases in XeF, KrF and ArF", by Burnham et al., *Appl. Phys. Lett.*, vol. 29, No. 11, Dec. 76.
"Modeling the KrF Laser Discharge", by Jacob et al., *App. Phys. Lett.*, vol. 28, No. 12, Jun. 76.
"Performance of XeF/KrF Laser Pumped by Fast Discharges", by Wang, *App. Phys. Lett.*, vol. 29, No. 2, Jul. 76.

*Primary Examiner*—William L. Sikes
*Assistant Examiner*—Léon Scott, Jr.
*Attorney, Agent, or Firm*—P. Martin Simpson; Roger S. Gaither; Richard G. Besha

[57] ABSTRACT

Method and apparatus for electrical excitation of a laser gas by application of a pulsed voltage across the gas, followed by passage of a pulsed, high energy electron beam through the gas to initiate a discharge suitable for laser excitation. This method improves upon current power conditioning techniques and is especially useful for driving rare gas halide lasers at high repetition rates.

8 Claims, 12 Drawing Figures

UV PREIONIZED DISCHARGE

TIME SEQUENCE OF APPLIED INPUTS AND RESPONSE

1. APPLY A PREIONIZATION SOURCE.
2. APPLY CHARGE VOLTAGE.
3. DISCHARGE CURRENT BEGINS.
4. DISCHARGE CURRENT REACHES MAXIMUM.

ELECTRON BEAM SWITCHED DISCHARGE FOR RAPIDLY PULSED LASERS

FIELD OF THE INVENTION

This invention relates to electron beam and electrical discharge systems for repetitively pulsed lasers.

BACKGROUND OF THE INVENTION

The invention described herein was made at the Lawrence Livermore Laboratory in the course of, or under, contract No. W-7405-ENG-48 with the U.S. Department of Energy.

Pulsed lasers that operate in the visible and ultraviolet region of the spectrum have potential applications in the areas of laser isotope separation and photochemistry. The rare gas halide (RGH) and rare gas excimer (RGE) lasers and the mercury halide lasers are examples of such lasers. Some of these applications require lasers that operate at high repetition rates with short pulses and modest energies per pulse. Typical parameters for such applications are energies of 0.1-1.0 Joules per pulse at repetition rates between 1 and 10 kHz, with pulse durations of 20-100 nsec. The combinations of these parameters corresponding to average power outputs of 0.1-1 kW is desirable. Lasers with suitable pulse widths and single pulse energies have been demonstrated, but they presently operate at relatively low pulse repetition rates and low average powers. These lasers are presently limited by gas heating and acoustic effects and by inadequate power conditioning systems. Higher average powers may be obtained by an increase in pulse repetition rate through application of convective flow for gas cooling, acoustic damping, and improved power conditioning techniques. The economic operation of RGH lasers at high repetition rates and high average powers is dependent upon the reliability and cost of the power conditioning system. This patent specification describes a technique for discharge laser excitation that leads to an improvement in electrical power conditioning at high repetition rates for pulsed lasers in general and RGH lasers in particular.

Pulsed RGH lasers have been excited using any of three techniques: direct electron beam excitation, electron beam-sustainer excitation and fast pulse electrical discharge. These techniques have also been used to excite a variety of other lasers (CO, $CO_2$, $Xe_2$, $N_2$, etc.), and an extensive literature is available describing such excitations. General aspects of the electron beam and electron beam-sustainer approaches are discussed in U.S. Pat. No. 3,641,454 to B. Krawetz. J. Daugherty et al, in *Applied Physics Letters*, Vol. 28, p. 581 (1976) discuss the electron beam-sustainer approach for $CO_2$ lasers; and beam-sustainer excitation of the $Xe_2$ laser is described by E. Huber et al, in *I.E.E.E. Journal of Quantum Electronics*, Vol. QE-12, p. 353 (1976).

Electron beam excitation of RGH lasers was first discussed by Searles and Hart in *Applied Physics Letters*, Vol. 27, p. 243 (1975) and by Ewing and Brau in *Physical Review A*, Vol. 12 (1975). Mangano et al, in *Applied Physics Letters*, Vol. 27, p. 495 (1975) and Vol. 28, p. 724 (1976), and Vol. 29, p. 426 (1976) have described RGH laser excitation by electron beam-controlled discharge pumping, and fast pulse discharge excitation of RGH lasers was first discussed by Burnham et al, in *Applied Physics Letters*, Vol. 29, p. 86 (1976). Nighan, in *I.E.E.E. Jour. of Quantum Electronics*, Vol. QE-14, p. 714 (1978), reviews the area of electron beam-controlled RGH lasers.

These several approaches have both advantages and disadvantages in operation at high repetition rates. In the direct electron beam technique, laser excitation is produced by passage of a high voltage electron beam through a thin metal foil and through the gas, with the electron beam producing ionization that ultimately results in laser excitation. The electron beam is the only source of energy for the discharge, and the electron beam current density must be relatively high to provide sufficient power deposition to excite the laser. Electron beam current densities greater than 10 A/cm² at voltages of a few hundred kilovolts are typically required for excitation of RGH lasers at a pressure of a few atmospheres, from the following considerations. Laser medium gain of 0.01-0.05 /cm requires power deposition of $$E_D = \frac{5 - 10 \text{ kW/cm}^3}{\epsilon}$$

where $\epsilon$ is the laser efficiency; and for $\epsilon = 0.1$ (characteristic of RGH lasers), $E_D = 50-100$ kW/cm³ requires a current density $J_b = 10$ A/cm².

Electron current densities of this magnitude are customarily obtained with cold cathode electrode guns. Each emitting surface of the cathode is pulse charged to a voltage of the order of 300 keV, and electrons are emitted from a plasma that subsequently forms near the cathode surface. Foil heating is a major limitation on maximum pulse repetition frequency for a pure e-beam excited medium, as a representative e-beam electron beam may deposit a significant amount of its kinetic energy in the foil before entering the gas volume. Once the beam enters the target gas volume, the beam loses about 30 eV in producing an ion, and each ion has the potential to produce a 5 eV laser photon upon electron-/ion combination; this represents a six-fold loss in efficiency. Further losses in efficiency occur by virtue of the tendency of noble gases, molecular halides and certain ions ($Ar_2$, $F^-$, etc.) produced by the discharge to absorb radiation throughout the ultraviolet. Electrons may also scatter out of the useful volume. The result is that overall efficiencies of about 6% are possible for RGH lasers pumped by electrons beams; self-absorption in RGE lasers limits the overall efficiency to $\lesssim 1\%$.

The use of the electron beam excitation technique for high repetition rate lasers is limited by heating of the foil window, intrinsic to this technique, since all the power input to the discharge is supplied by the electron beam. With increasing repetition rate and current density, the mean temperature of the foil increases. With present foil materials and foil cooling techniques, the average beam current density is limited to less than approximately 1 mA/cm². For a duty cycle of 0.1%, typical for some applications of short pulse lasers, the peak current density is thereby limited by foil heating to less than approximately 1 A/cm² under conditions suitable for efficient, high pulse repetition rate operation, which is insufficient to excite a RGH laser directly.

The electron beam current density required for laser excitation can be reduced by the use of electron beam-sustainer techniques, whereby a small, steady voltage below the breakdown voltage is applied across a pair of electrodes immersed in the same gas that is excited by the electron beam. Additional power input to the discharge is obtained from this sustainer electric field, but the sustainer current density required is apparently $J_B \gtrsim 2$ amp/cm$^2$ (Huber, supra). For the same power deposition in the gas, the electron beam power input can be reduced accordingly as the sustainer contribution increases. However, the electron beam power input cannot be reduced to an arbitrarily low value. Power input from the sustainer field increases with the applied electric field, but there is a maximum electric field that can be applied without the onset on ionization instabilities in the laser gas. Further, the power transfer from the sustainer field is itself determined by the electrical characteristics of the discharge produced in the laser gas by the electron beam. For RGH lasers, the electrons produced by the electron beam are rapidly removed by dissociative attachment to the halide component of the laser gas, and the electrical conductivity of the discharge is reduced proportionately. Thus, in RGH lasers, a relatively high electron beam current density is required to provide sufficient conductivity to allow adequate power transfer from the sustainer field. In a slightly different approach, sometimes referred to as the electron beam-controlled discharge, the electron density is allowed to grow by avalanche ionization from an initial value determined by the electron beam. The degree of enhancement that can be obtained over that of the electron beam alone is limited by the onset of an instability in the laser medium, leading to a constrictive arc. The reduction in electron beam current density by both these techniques is not sufficient to allow operation at high repetition rates within the limits imposed by the electron beam foil.

Simple electrical discharges are also often used to excite RGH lasers. Such discharges can produce single pulse energies of the order of one Joule and pulse lengths of 10–100 nsec, with overall efficiencies of the order of 1%.

Three methods of establishment of diffuse large area electrical discharges are available in the prior art for laser excitation. The first method uses many individually excited electrodes producing many independent small discharges in parallel. This method is typically inefficient in coupling electrical energy to the discharge and produces a markedly non-uniform spatial discharge. The second method uses a pre-ionization source such as a spark that is fired before the main discharge voltage is applied to the gas; this source produces a small density of free electrons in the gas. A main discharge voltage pulse with a fast rise rate is then applied between two large electrodes; and if the voltage pulse rise rate is sufficiently high, a diffuse and reasonably uniform discharge can be established and maintained for a short time between the electrodes. However, an undesirable collapse to a constricted arc-type discharge will follow in a few microseconds or less, if the discharge is at useful levels. If the voltage pulse rise rate is too low, a diffuse discharge does not form, and the charge flow develops in constricted channels from the beginning. The peak applied voltage for this approach must exceed the static breakdown voltage for the discharge.

A third discharge method uses an e-beam sustained electrical discharge, where the external source of ionization (the e-beam) remains on during the entire pulse. The electron beam controls the power input to the laser gas. Power is deposited in the gas *only* while the electron beam is applied, in contrast to the present invention where the electron beam is used merely to initiate the process. The ionization produced by this source using the sustainer method is much more intense than the pre-ionization intensity used in the uv preionization method above, and is in fact so intense that it is the dominant and controlling ionization source during the entire discharge pulse. The discharge voltage need not be high enough to produce sufficient ionization in the gas to sustain the discharge by itself. Externally sustained discharges such as these can typically be made spatially more uniform and for longer times and at higher pressures than the simpler self-sustained discharges. Only a modest fraction of the electrical excitation need be delivered by very high energy electrons passing through a foil so that maximum pulse repetition frequencies are potentially higher than for pure e-beam pumped devices. However, where a RGH laser is used, the e-beam must still supply 0.2–0.4 of the excitation energy to maintain discharge stability so that the advantages of this technique are not as great as for certain other lasers. For the 10.6 $\mu$m $CO_2$ laser, for example, the required e-beam excitation can be less than 0.1 of the total excitation energy supplied.

The techniques used to generate high current density, short pulse, electron beams are not suitable for operation at high pulse repetition rates. The electron beam is generated by application of a pulsed high voltage to a cathode, and the electron emission processes tend to destroy the cathode surface and to modify the cathode electrical characteristics. In addition, the generation of high voltage pulses requires switches capable of long life operation at high voltage and high average power. Such switches are not presently available. Substantial improvement in system performance could be made if the electron beam requirements for laser excitation are reduced. Several techniques exist for electron beam generation at lower current densities, techniques which may also allow high pulse repetition rate operation. Gridded hot cathode systems and wire-plasma electron guns are two such systems.

It is an object of the invention to provide an electrical discharge method for exciting an optical gain medium that allows high repetition rates, small initiating current densities and increased lifetimes for electrical switching apparatus.

Another object is to improve electrical discharge laser operation by reducing the peak power required to be supplied by the associated electrical circuits in exciting the laser.

Another object is to reduce the required electron beam intensity for laser operation.

Another object is to stabilize the electrical discharge at high peak powers by use of a low inductance primary power source.

Other objects and advantages of the invention will become clear by reference to the drawings and detailed description.

SUMMARY OF THE INVENTION

The subject invention (hereinafter called the switched discharge method) a method and apparatus for producing an electrical discharge for laser excitation that operates in a parameter regime differing from methods used in the prior art and greatly eases the engineering problems associated with switching in RGH and RGE lasers. The method comprises the steps of providing a rare gas and halogen gas mixture, having an associated self breakdown voltage $V_{dc}$, in a discharge volume having an electrode gap of at least 1 cm; applying a pulsed electric field across the discharge volume over a time interval Δt, with the associated electric field voltage lying above $V_{dc}$ but below the "transient pulse breakdown voltage" $V_{\Delta t}$, defined as the voltage required to cause breakdown upon application for a time interval Δt (here, a few microseconds; $V_{\Delta t_1} > V_{\Delta t_2} > V_{dc}$ if $\Delta t_1 > \Delta t_2$); providing a screen electrode to admit energetic electrons into the discharge volume; and providing an electron beam pulse that passes through the discharge volume, with the e-beam having an intensity sufficient to initiate electrical discharge across the discharge volume. The voltage is increased to a value $V < V_{\Delta t}$ over a relatively long interval (Δt > μsec) so that switch lifetimes are prolonged to perhaps $10^8$ cycles.

This method and apparatus produces a self-sustained discharge but uses a short, externally produced e-beam pulse to ionize and switch the gas from a nonconducting to a conducting state. The external (e-beam) ionization source only provides an initiating event; it does not dominate over or control the subsequent current flow as is the case for a conventional e-beam sustained discharge. After application of the switching pulse in the subject invention, the discharge develops substantially as in a pre-ionization discharge. The main discharge voltage $V < V_{\Delta t}$ is applied before the switching pulse and is usually higher than the static breakdown voltage $V_{dc}$ of a conventional discharge.

There are several unexpected and significant benefits arising out of this invention. The method and apparatus allows an increase in switch lifetimes by 2–3 orders of magnitude, to $10^8$ cycles, by lengthening the time for voltage buildup to intervals of 1 microsecond or more and by decreasing the required electron beam current density to as low as 0.1 amps/cm². This e-beam current density is about two orders of magnitude lower than that required for conventional e-beam sustained discharges. This invention allows operation of the switched discharge in new parameter regimes and using gases (such as pure argon at substantially atmospheric pressure) that are inoperable with prior art approaches. The method of this invention utilizes discharge voltage maximums that are below the magnitude required to initiate discharge over the associated time period (1 microsecond or more) in a prior art device. This invention allows for use of high reliability, high repetition rate and low cost supplies with rare gas halogen lasers. Such systems with high reliability, repetition rate and low cost have been heretofore unobtainable.

DETAILED DESCRIPTION

The rare gas halide (RGH) laser can potentially provide high average power in the ultraviolet region of the spectrum. Presently available RGH lasers operate at low pulse repetition frequencies and low average power output. Operation at high pulse repetition frequencies and/or high average power operation is desirable for applications such as laser isotope separation, but such operation is presently limited by switching requirements.

As noted above, three different approaches using electron beams and/or discharges are available to excite RGH lasers: (1) direct electron beam excitation; (2) electron beam-controlled electrical discharges and electron beam-sustainer excitation; and (3) fast pulse electrical discharge. The techniques differ in the manner in which the primary and/or secondary power is applied to the laser gas volume.

The subject invention, the switched discharge method, utilizes a self-sustained discharge that is initiated by a short pulse from an intense external source of ionization to switch the target gas from a nonconducting to a conducting state.

Figure 1:
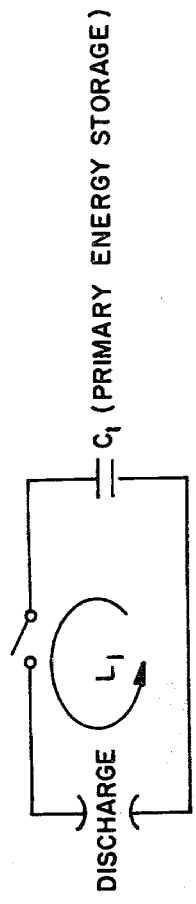
FIG. 1 is an energy storage/discharge circuit used in the prior art.

The utility of the switched discharge method arises from certain specific characteristics of RGH laser discharges. If one operates these discharges according to the pre-ionization discharge method, optimum output is obtained when the main discharge voltage across the device rises rapidly to a value several times the static operating or d.c. breakdown voltage, in a time of 100 nsec or less. Longer voltage risetimes result in discharges of very poor quality. In addition, the optimum discharges maintain a quality suitable for laser operation for very short times, typically only about 20–40 nsec for a device with a 2.5 cm discharge gap. These features introduce significant engineering problems in prior art devices such as shown in FIG. 1, which shows a typical discharge circuit. The RGH lasers require a discharge current of some tens of kiloamperes at an operating voltage of a few kilovolts, for typical discharge lengths of 50–100 cm. The inductance $L_1$ of the loop in FIG. 1 must be kept as small as possible to transfer large energies from $C_1$ to the discharge in 20–40 nsec. Unavoidable use of high inductance loops appears to be endemic in the prior art techniques for electron beam-driven laser medium excitation; and the use of low inductance loops is another distinguishing feature of the present invention. The switch and the connections to it must therefore have extremely low inductance, and this presents a serious design problem, particularly for operation at high average power performance. Typically, many parallel switches, either spark gaps or thyratrons, are required to keep the loop inductance $L_1$ within acceptable limits. The loop current can be increased by raising the voltage on $C_1$; but operation at a high impedance $Z = \sqrt{L_1/C_1}$ reduces the fraction of the energy stored in the capacitor $C_1$ that is coupled into the discharge during the period of stable operation, thus affecting efficiency and also undesirably depositing the excess energy in various parts of the device at later times. A further disadvantage of the prior art approach is that the fast current pulse used must pass through a switch, with switch lifetime decreasing sharply with increasing peak power.

Figure 2:
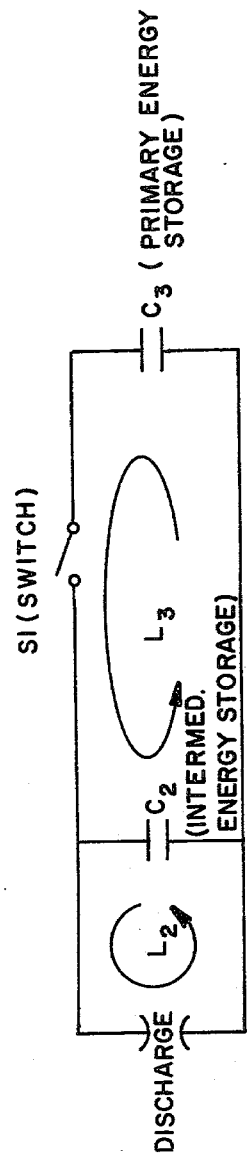
FIG. 2 is one embodiment of an energy storage/discharge network used in the subject invention.

FIG. 2 shows an approach, used in the subject invention, that ameliorates many of these difficulties. A primary storage capacitor $C_2$ is coupled as closely as physically possible to the laser discharge so that $L_2$ is as small as practical. This intermediate storage capacitor $C_2$ is then charged from the secondary storage capacitor $C_3$ through a switch so that the voltage on $C_2$ rises in a time interval that is less than the 50 nsec rise time that the laser discharge will tolerate. The switch need not manifest such low inductance as in FIG. 1. The fast current pulse that excites the laser discharge does not pass through any switch.

Consider now the circuit of FIG. 2, operated as part of the switched discharge method. The inductance $L_2$ must still be kept as small as practical to couple the maximum amount of energy to the discharge in 20–40 nsec. However, the transfer from the primary energy storage capacitor $C_3$ to the intermediate storage capacitor $C_2$ is extended over a much longer time (nominally, a few microseconds), which greatly relieves the design problems with the switch and the inductance $L_3$ and makes it possible, for example, to use a single thyratron of modest size as the switch. The intermediate storage capacitor $C_2$ is charged to a voltage higher than the static breakdown voltage of the discharge, but less than the transient breakdown voltage for microsecond pulses $V_{\Delta t}$.

Switched discharge operation has not been important in the past for $CO_2$ lasers; these lasers can tolerate much longer discharge pulses (on the order of microseconds) and do not present as serious a switch design problem as RGH lasers with pulse durations in the tens of nanoseconds.

Excitation of RGH lasers by the e-beam-controlled discharge has been demonstrated in the teachings of Huber and Krawetz, supra, but has serious limitations. The external source of ionization must provide a significant fraction of the energy deposited per unit volume in the laser discharge, in order to control these particular gas mixtures. These externally sustained discharges in RGH gas mixtures must also operate at smaller energy density than self-sustained discharges, in order to maintain stability. Very low energy density is undesirable in a repetitively pulsed system cooled by convection since much more gas must flow through the system. Externally sustained discharges have, however, maintained good discharge quality for perhaps half a microsecond, in contrast to the 20–40 nsec discharge pulse achieved with prior art discharge methods.

Figure 3:
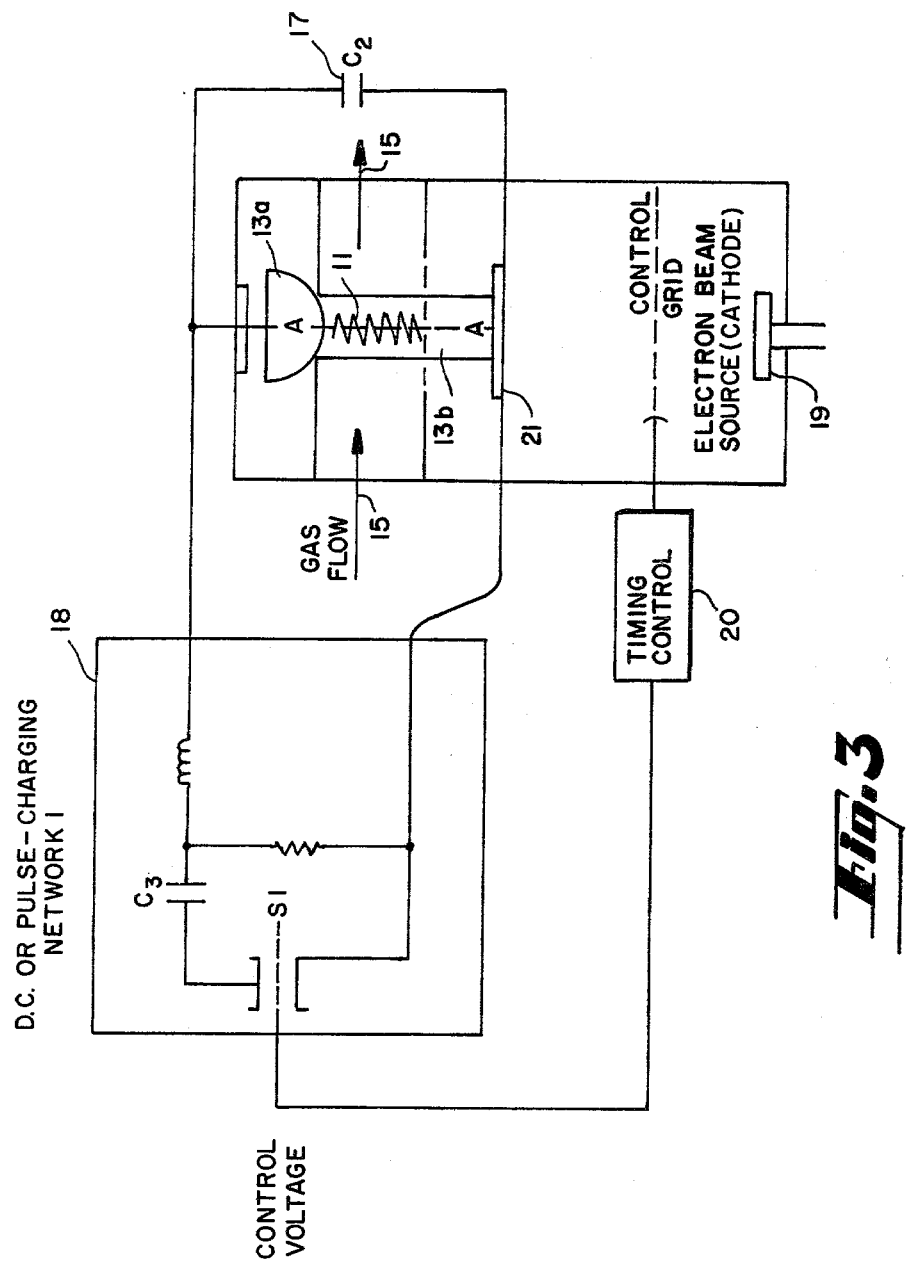
FIG. 3 is a schematic view of one embodiment of the subject invention. p

The subject invention avoids the above-mentioned limitations and provides capability for operation at high pulse rates and high average power by an amalgamation, using features of each of the above techniques to allow operation in new physical parameter regimes affording improved performance of the electrical power conditioning system. With reference to FIG. 3, a laser gas volume 11 is positioned between a pair of laser discharge electrodes 13a and 13b, similar to those used by the conventional discharge laser. These electrodes may be solid or porous, as appropriate. The laser gas may be stationary in the volume 11. Alternatively, a gas flow 15 may be provided, preferably moving transversely to the long axis AA of the discharge, to provide convective cooling of the gas in the volume 11 and of the electron beam foil 21. The primary storage capacitor at 17 is charged to a voltage *above* static (DC) breakdown voltage and *below* the transient pulse breakdown voltage $V_{\Delta t}$ of the particular gas mixture used, by a switched power supply 18 having a transfer time that is long compared to discharge duration; a thyratron switch or array of such switches are appropriate here for the switched power supply 18.

An electron beam source, having a cathode 19, a timing control grid 20 and an anode foil 21, is positioned as shown so that an e-beam pulse may be applied to the gas volume 11 through the screen electrode 13b. The e-beam timing and control means intensity is below the average power limits on the foil 21 (less than about 1 $A/cm^2$ for 100 nsec pulses at 10 KHz) but is somewhat above the intensity required for preionization of a conventional discharge laser (i.e., greater than about 0.05 $A/cm^2$). Under these conditions the discharge will switch into a low impedance mode under the influence of the electron beam and dissipate the energy stored in the capacitor 17 across the discharge volume 11, in a manner suitable for RGH laser excitation. The majority of the power input comes from the discharge circuit rather than from the electron beam, but the electron beam must be capable of operation at the desired pulse repetition frequencies ($\lesssim$ 10 KHz).

The pressure of the gas volume 11 in one embodiment is approximately 700 torr, mostly He or Ar plus 100 torr of Kr plus 3 torr of $F_2$ for a KrF laser; In such a gas, self breakdown occurs with a static field as low as 10 KV/cm and $V_{\Delta t}$ is $\approx$ 20 KV/cm. For the 2.5 cm electrode gap contemplated here, the voltage would be kept below, say, 50 KV (20 KV/cm). Electrode gap spacing is 2.25 cm, and the voltage reaches 40 KV at the time the electron beam is applied. Representative parameters for the electron beam are: e beam energy and pulse width, 250 KeV and 100 nsec, respectively; the e beam exits through a 1-mil thick aluminized Mylar foil at a resulting current density of 0.25 amps/$cm^2$; and e beam current rise time was 50 nsec. The laser cavity was comprised of a 100% reflector and a 70% output coupler, each having a 5 M radius of curvature, with mirror separation 0.8 M. The laser cell was closed with Brewster windows of $CaF_2$, with resulting path length 0.6 M. Maximum output of the $\lambda = 2490$ Å light was 150 millijoules, with laser pulse width 20–25 nsec, although recent improvements have increased this to 600 millijoule output.

Figure 4:
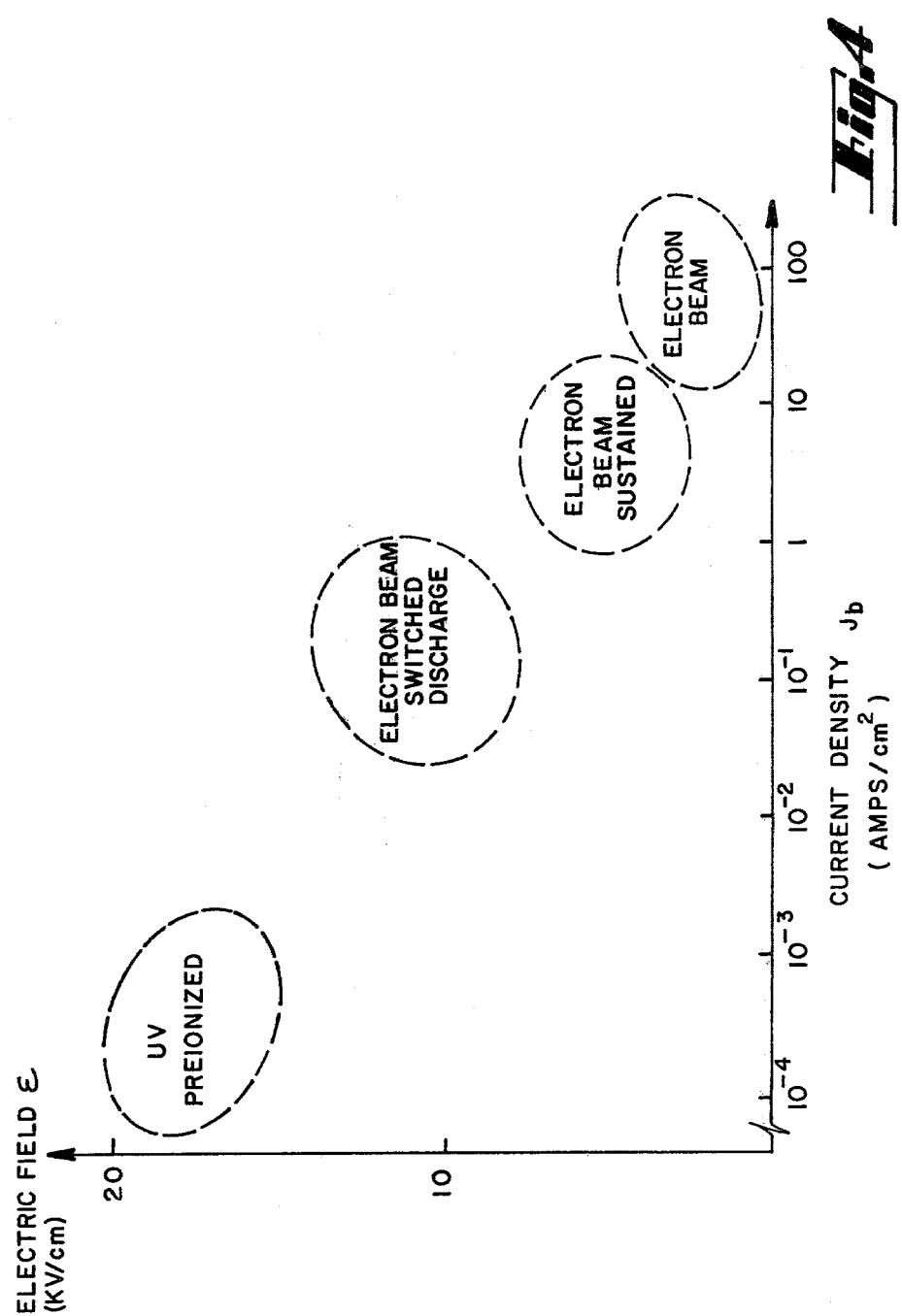
FIG. 4 is a graphic representation of the parameter regimes (electric field vs electron beam current density) useful in different prior art approaches and for the subject invention.

FIG. 4 indicates schematically the different regions of operation of some of the known laser gas electrical excitation techniques. The uv preionized discharge method requires application of a large electric field generally 20–40 KV/cm to a medium that is already partially preionized or preconditioned by a weak, external pulse of radiation such as might be supplied by a uv source or a low intensity electron beam source ($J_b = 0.1$–$1.0$ milliamps/cm$^2$). With this approach, the time interval $\tau_p$ for preionizing the gas is relatively long ($\tau_p \sim 10$ μsec) and the period $\tau_s$ available for switching in the high electric field is relatively short ($\tau_s \lesssim 100$ nsec). This stresses the switch and usually produces a short associated switch lifetime ($\lesssim 10^6$ pulses).

At the other end of the spectrum, one has the e-beam or e-beam plus sustainer approach, allowing use of modest electric field strength, say $\epsilon \lesssim 2$ KV/cm, but requiring large current densities ($J_b \lesssim 10$ A/cm$^2$).

Figure 5:
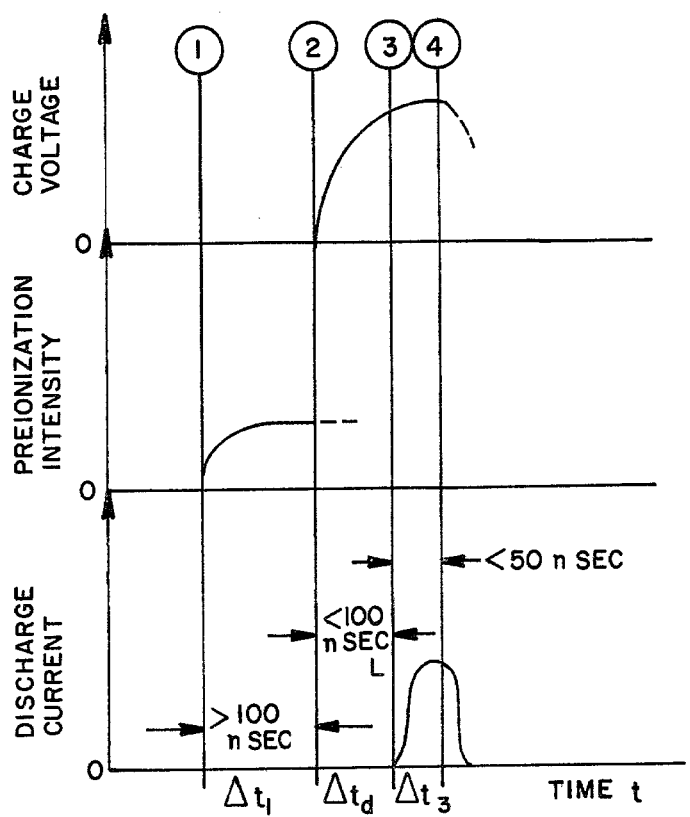
FIG. 5 is a graphic representation of increase in the imposed electric field in the discharge volume, as a function of time, for the subject invention.
Figure 6:
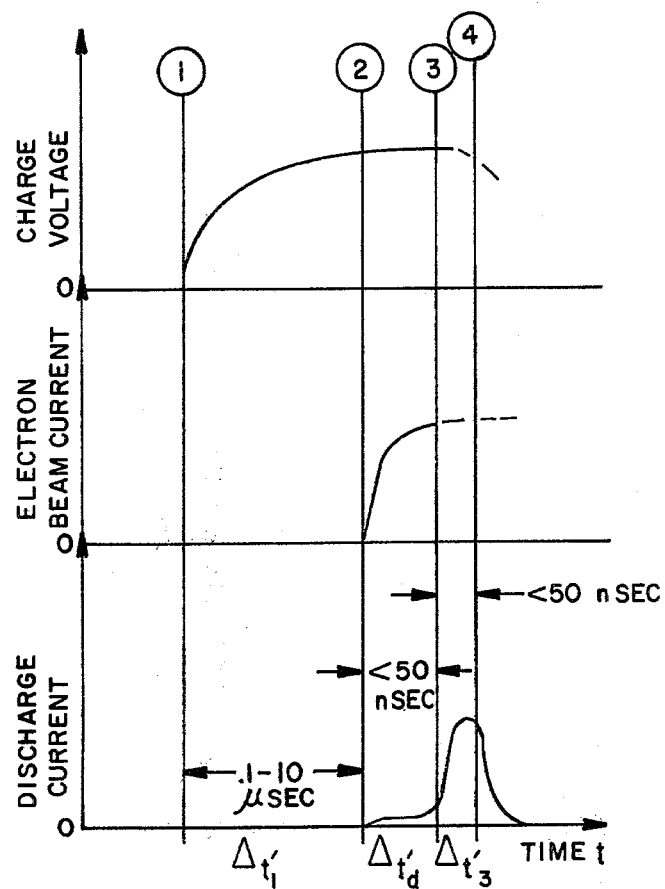
FIG. 6 is a graphic representation of electron beam current density ($J_b$) and e-beam-switched discharge current density ($J_d$), as a function of time, for the subject invention.

FIGS. 5 and 6 exhibit, for comparison purposes, the temporal behavior of applied voltage, excitation intensity (pre-ionization/electron beam) and resulting discharge current for the uv pre-ionization method versus the presently claimed electron beam-switched discharge method, respectively. In the uv preionization discharge approach of the prior art (FIG. 5), (1) a pre-ionization source is provided, followed a time $\Delta t_1 > 100$ nsec later by (2) application of an electric field, (3) followed by discharge current initiation at time $\Delta t_d > 100$ nsec later and then by (4) current peaking after an additional time $\Delta t_3 > 50$ nsec. In the switched discharge method, one begins with (1) application of an electric field, followed a time $\Delta t_1' = 1$–$10$ μsec later by (2) application of an electron beam, followed by (3) discharge current flow beginning at a time $\Delta t_d' < 50$ nsec later and then by (4) a peak current after an additional time $\Delta t_3' < 50$ nsec. The switched discharge method allows operation at modest e-beam current densities ($J_b \geq 0.1$ A/cm$^2$), applied subsequent to imposition of an electric field of strength $\epsilon = 10$–$20$ KV/cm. Using relatively long electric field build-up times of 1–10 μsec. (FIG. 6), the lifetime of the switch S1 of FIG. 2 is extended to an estimated $10^8$ cycles or greater. In FIG. 6, the conductivity is initially governed by the free electron density $n_e$ produced by the e-beam; but thereafter the discharge is not controlled by subsequent e-beam intensity.

Figure 7:
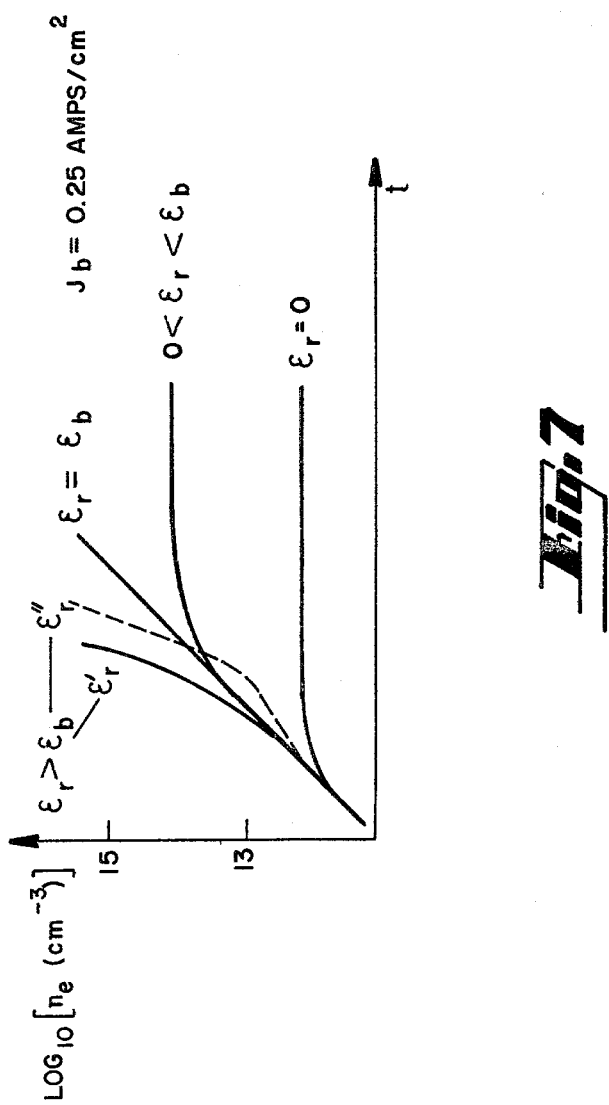
FIG. 7 is a graphic representation of free electron density, as a function of time and with various ramped electric fields ($\epsilon_r$), for the subject invention.

FIG. 7 exhibits the theoretical growth of $n_e$ with time, using the switched discharge, for different ranges of maximum values of the initial ramped electrical field, $\epsilon_r$. The static breakdown electric field $\epsilon_b(J_b)$ for the laser gas is 10–20 KV/cm for a noble gas/halide gas at a total pressure of about one atmosphere (6800 Pascals) with $J_b = 0.25$ A/cm$^2$. The curve $\epsilon_r = 0$ corresponds to the sustainer mode and the curve $0 < \epsilon_r < \epsilon_b$ to a recombination-limited curve; both of these curves exhibit early saturation. Where the static initial field $\epsilon_5 = \epsilon_b(J_b)$, the recombination losses and avalanche effects are in approximate balance so that log ($n_e$) grows linearly with t. For $\epsilon_r > \epsilon_b(J_d)$, the avalanche effects may be controlling from the beginning, in which event log ($n_e$) will grow faster than linearly and follow a curve $\epsilon_r'$; however, if recombination is controlling initially (for small values of $n_3$), log ($n_e$) may initially lie below the linear growth curve ($\epsilon_r = \epsilon_b(J_d)$) and grow faster than linearly (curve $\epsilon_r''$) only after $n_e$ has attained some threshold value. As yet, it is difficult to determine whether the quantity log ($n_e$) follows a curve $\epsilon_r''$ or follows a curve $\epsilon_r''$ above the breakdown field $\epsilon_b = \epsilon_b(J_d)$.

Figure 8:
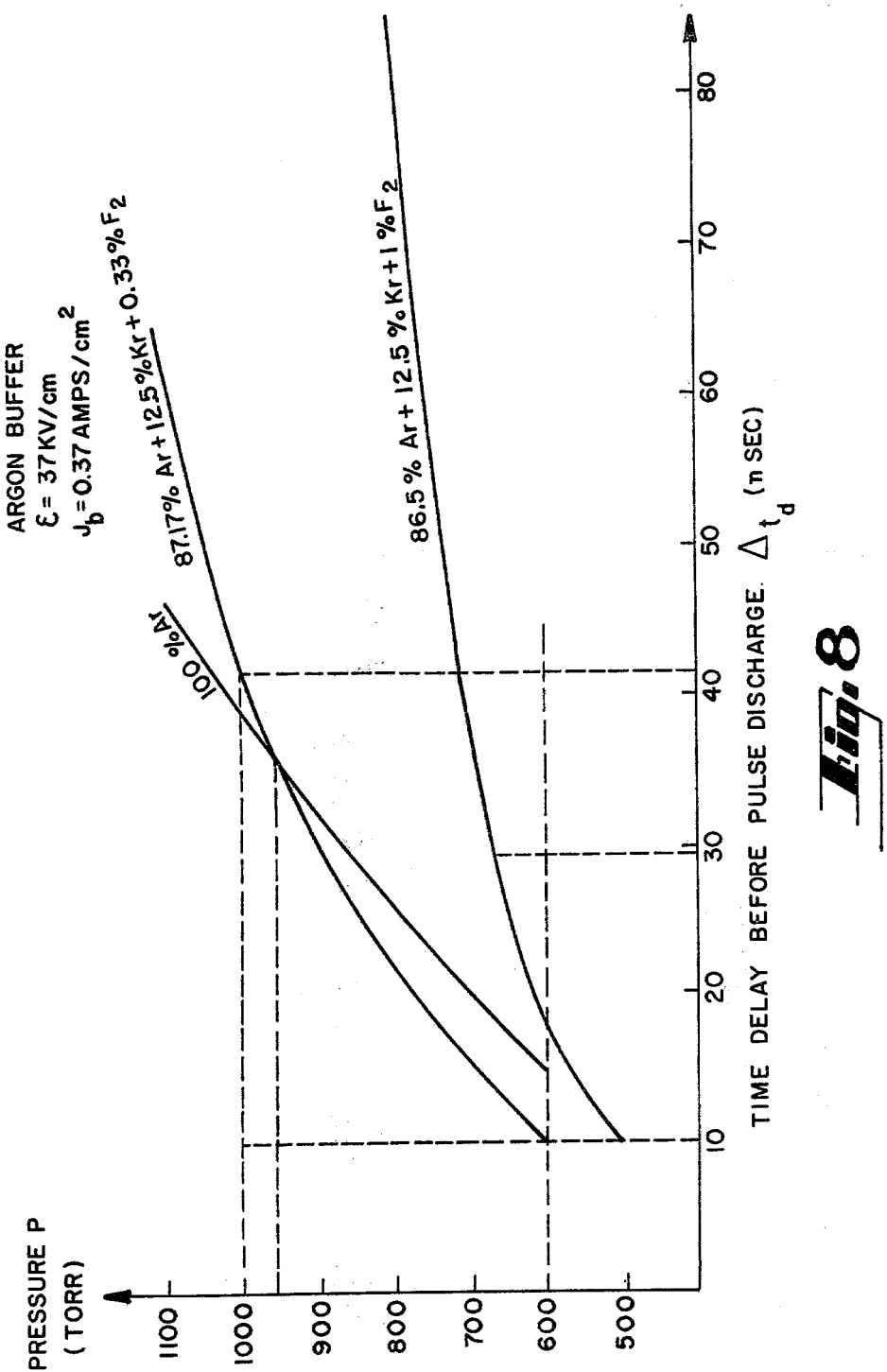
FIGS. 8 and 9 are graphic representations of time delay ($\Delta t_d$) for pulse discharge as a function of operating pressure (P) in the discharge volume, for argon and helium buffer gases, respectively.
Figure 9:
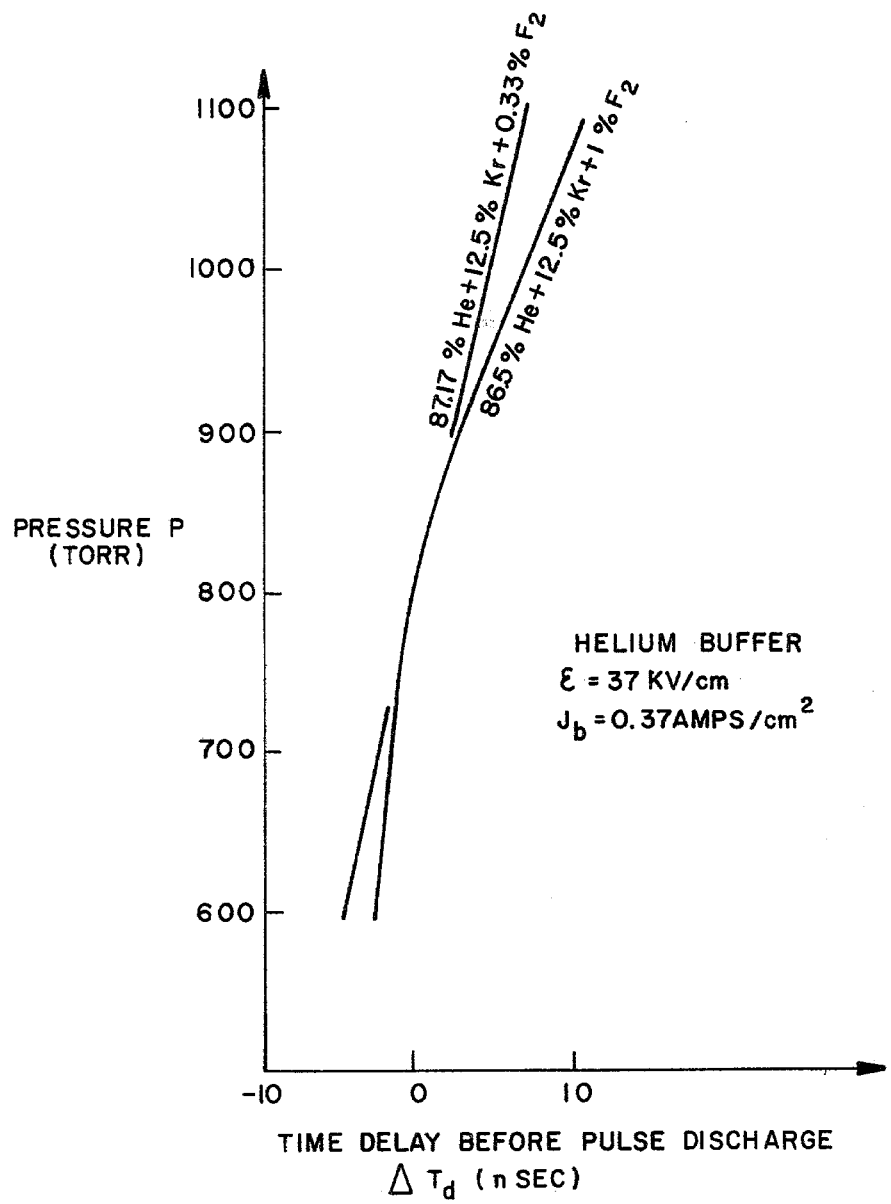

In FIG. 8, the measured dependence of discharge time delay $\Delta t_d$ upon total pressure p of the laser gas (primarily Ar), for different gas compositions of a gas having an Ar buffer and laser components Kr+F, is shown. One notes that for $J_b = 0.37$ A/cm$^2$, the discharge time delay is longest for a mixture 86.5% Ar + 12.5% Kr + 1% F$_2$ and is shortest (for p $\sim$ 950 torr) for a mixture 87.17% Ar, 12.5% Kr and 0.33% F$_2$. The variation of $\Delta t_d$ with % F$_2$ present is much smaller where an He buffer is used, as indicated in FIG. 9, but either buffer may be used with the switched discharge method.

Figure 10:
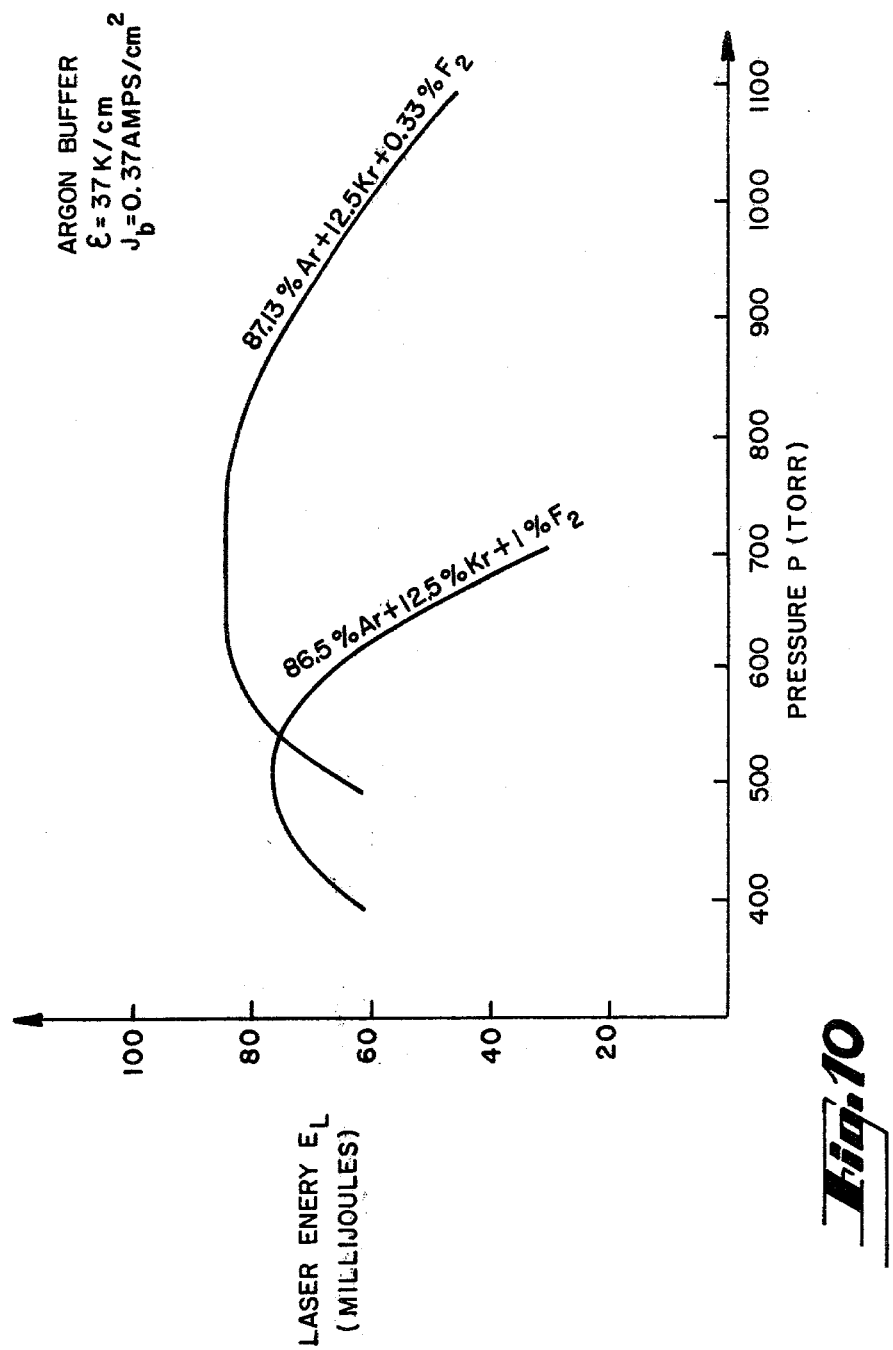
FIG. 10 is a graphic representation of KrF laser energy output ($E_L$ in millijoules), as a function of operating pressure for differing percentages of $F_2$ in an argon-buffered medium.

The measured laser output $E_L$ varies with total gas pressure p and with gas composition, as indicated in FIG. 10 with $J_b = 0.37$ A/cm$^2$, as well as with many other parameters such as mirror reflectivities. The total laser output is apparently only slightly sensitive to the gas composition, but manifests a well-defined pressure dependence. The appearance of the broader maximum for a gas containing 0.33% F$_2$, vis-a-vis a gas containing 1% F$_2$, is also characteristic of the laser output for the uv preionization method; but the uv preionization method is inoperable with an Ar buffer. Thus the switched discharge method is operable with at least one gas mixture (Kr/F/Ar) for which the uv preionization method is inoperable. Presence of this broader maximum is useful if the total system pressure is stochastic and not controllable within a narrow range of pressure; but the optimum pressure corresponding to 1% F$_2$ occurs at a smaller system pressure (p $\sim$ 500 torr), and this system requires less energy to recirculate the (less massive) laser gas than does the system with 0.33% F$_2$. Within a reasonable range of F$_2$ fraction in the gas, then, a higher percentage of F$_2$ is preferable if one is concerned primarily with gas recirculation energy expended.

The operation of the switched discharge concept has been demonstrated, and FIGS. 5, 6, 8, 9 and 10 are based on experimental data. The operation conforms to the general concepts presented in this detailed description.

The switched discharge method is operable with He, Ne or Ar buffers while, as noted above, the uv preionization method is apparently operable only with He. Sze, in Jour. of Appl. Phys. 50, 4596 (1979) has recently reported laser action in XeCl with He, Ne or Ar as buffer, using an electric avalanche discharge. Sze works only with total gas pressures of 1000–2500 torr, which are 2–5 times as high as the optimal pressures for the switched discharge method. Further, laser energy output sizing Sze's approach with a neon buffer apparently increases with increasing pressure, indicating that an optimal pressure, if such exists, occurs only at very high total pressures. Optimum pressure for He buffering appears to be about 2300 torr for Sze's approach. For the switched discharge method, optimum pressure occurs at much lower pressures—for example, at p = 500 torr for Ar buffering, as shown in FIG. 10. Further, Sze's laser apparatus requires current densities of about 625 amps/cm$^2$, delivered over a time interval of about 30 nsec, as may be inferred from his earlier report in Rev. Sci. Instrum. 49 772 (1978). A third report, Sze and Scott, 33 Appl. Phys. Lett. 419 (1978), discusses the difficulties of obtaining laser action in RGH media such as XeCl and KrCl and concludes that high energy laser response is favored in electric discharge approaches over electron beam excitation of the laser medium.

The system used consisted of the general components shown in FIG. 3, with the exception that gas flow was not included. The laser gas mixture was contained in a Teflon cell, and metal electrode holder plates formed two of the cell surfaces. The electrodes were 30 cm long and approximately 2 cm wide. One electrode was constructed with a 1 cm × 30 cm slot through which the electron beam entered the active discharge volume, this electrode being covered with a fine mesh screen. The electrode separation was nominally 2.5 cm. The electron beam was obtained from a commercial source, and its nominal characteristics were a beam current of 10 A/cm$^2$ at 250 KV for a duration of 100 nsec. The beam current density was attenuated prior to entering the active discharge volume by placing a series of fine mesh screens behind the screened electrode. Beam current densities 250 ma/cm$^2$ were reliably obtained by this method. The intermediate energy capacitor $C_2$, was made up of 30 ceramic capacitors arrayed along the length of the electrode, with the nominal capacitance being 500 $\mu$f/ capacitor at 40 KV. The pulse charging network consisted of a 0.1 $\mu$f/capacitor ($C_3$ of FIG. 3), switched by a triggered spark gap ($S_1$). Sufficient inductance was added to this circuit to obtain charging times for $C_2$ of nominally 5 $\mu$sec, and the primary capacitor, $C_3$, was charged with a dc power supply. Laser output was used as one measure of performance. The optical cavity was formed by Brewster window and a pair of mirrors with nominal reflectivities of 98% and 70%. The gas mixture was Ar: Kr: $F_2$ in the ratios 945:50:5. In addition to tests under these nominal conditions variations of conditions and components were undertaken to establish the range of potential operation, sensitivities to parameters and conditions of optimal performance for this particular configuration. These variations are listed in Table 1.

As noted above, the switched discharge method allows laser operation in a gas buffered by He, Ar or Ne, or one of the higher atomic weight noble gases. Thus, operation of an RGE laser, using Ar or Kr or Xe, is possible, although this has not yet been experimentally demonstrated.

Figure 11:
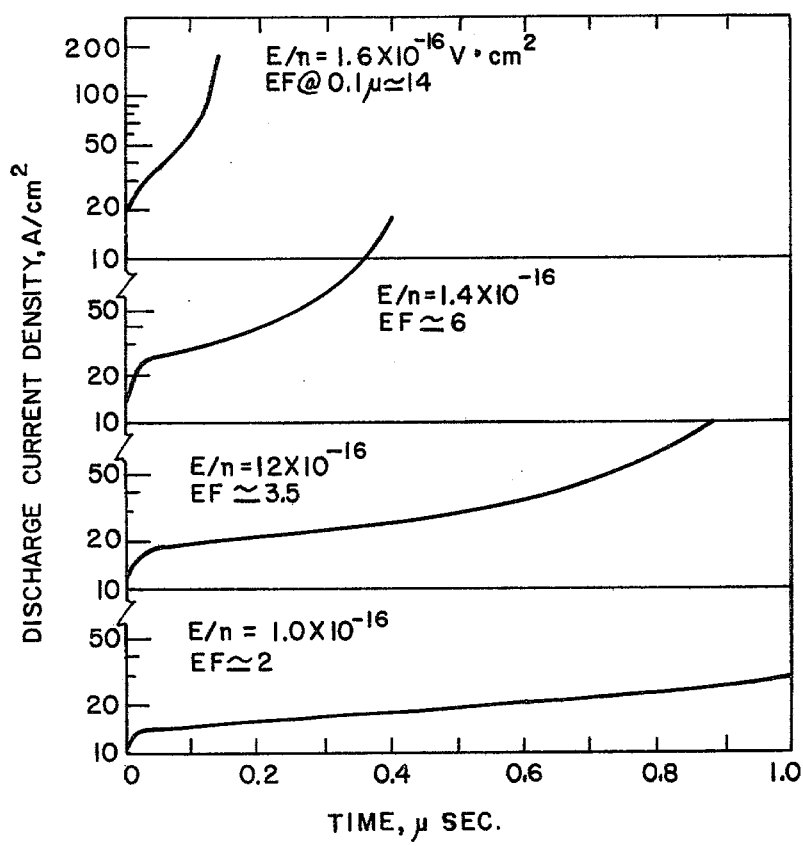
FIG. 11 is a graphic representation of discharge current density versus time for a conventional electron beam controlled discharge method of excitation of a rare gas halide laser.

Nighan, in his review of electron beam-controlled discharge excitations of RGH lasers, supra, notes that the e beam-controlled discharge (ebcd) approach appears to allow scaling to higher average power than does the pure e beam approach. One problem with the conventional ebcd approach is that the electric field-gas-density ratio E/n is limited to values below $1.2 \times 10^{-16}$ volts/cm$^2$, if one would maintain a stable discharge for periods of the order of 0.5 $\mu$sec or longer. This is shown graphically in FIG. 11, herein, which reproduces Nighan's FIG. 19. This limits one to use of rather low magnitude electric fields or high densities, or else instabilities such as arc and streamer formation occur before all useful energy can be deposited in the laser gas. The switched discharge method, by contrast, works with electric fields of about 30 KV/cm and gas densities of about $2 \times 10^{19}$ cm$^{-3}$ so that $E/n \approx 1.5 \times 10^{-15}$ volts/cm$^2$, an order of magnitude larger than the maximum practical values available for a conventional ebcd approach.

Figure 12:
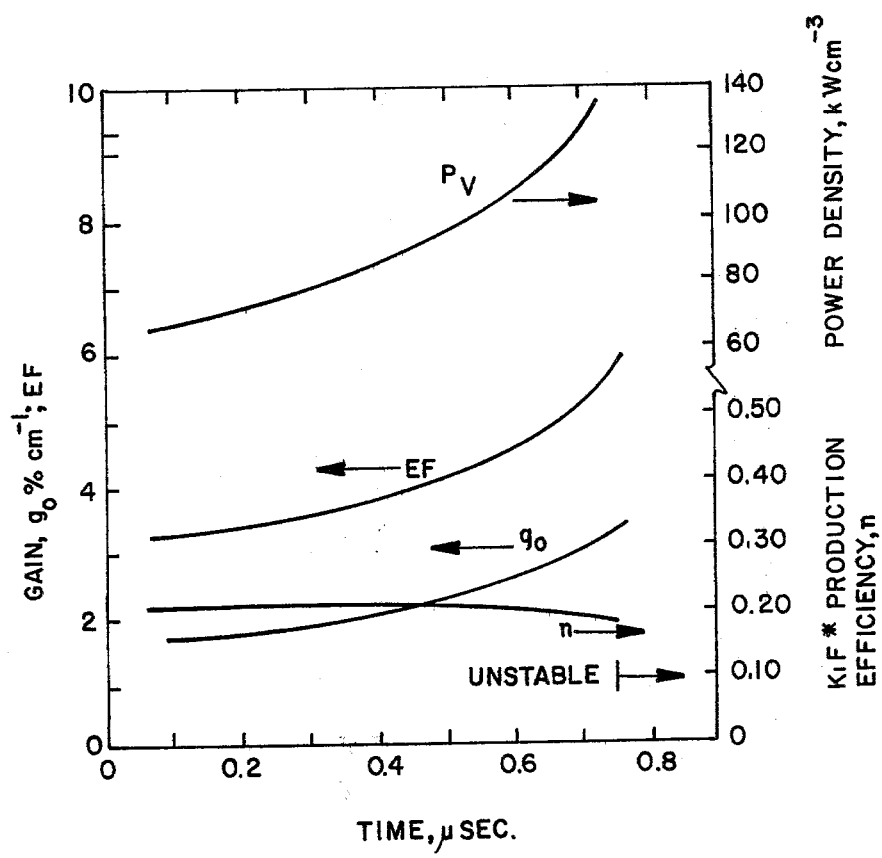
FIG. 12 is a graphic representation of power enhancement factor (EF), electrical power density (P), small signal gain ($g_o$) and rare gas halide excimer production efficiency ($\eta$) for a conventional electron beam controlled discharge method of excitation of a rare gas halide laser such as KrF.

A second problem with the ebcd approach with RGH lasers, noted by Nighan, supra, is the relatively small power enhancement factor EF(=discharge power$\div$e beam power supplied). As indicated in FIG. 12 herein, which reproduces Nighan's FIG. 9, for the ebcd approach EF$\approx$2-4 in the region of stable discharge operation. This is disappointingly small compared to the EF available for infrared molecular lasers (EF$\gtrsim$1000) and is a direct consequence of the high e beam power required to maintain the electron density at a sufficient level in the presence of the enormous loss of electrons due to halogen dimer (e.g., $F_2$) dissociative attachment. For the switched discharge method, with V=30 KV, $Z_o$ (gas impedance at discharge)=0.5$\Omega$, E=10 KV/cm and $J_b$=0.1 amp/cm$^2$ one verifies that EF=($V^2/Z_o)/J_b(-dE/dx) \approx$40,000 at the time of discharge or peak current flow.

The switched discharge method achieves this performance level by ramping the imposed electric field relatively slowly (over a period $\Delta t \approx 1$ $\mu$sec) to a voltage near to but below the transient breakdown voltage $V_{\Delta t}$ associated with the particular laser gas at that pressure. After a time $\Delta t$, a small e beam current ($J_b$=0.1-1.0 amp/cm$^2$) is applied to the discharge volume and discharge occurs. Potential instability, through arc and streamer formation in the gas, is still present, but it occurs long after the peak in current density ($\Delta t' \approx 50$ nsec after e beam current application). One thus achieves enormous values of EF ($\approx$40,000) with the switched discharge method by delaying the onset of instability.

Although the preferred embodiments of the invention have been shown and described, variation and modification may be introduced without departing from the scope of the invention.

TABLE 1

| Parameter | Range of Variation | Results and Comments |
|---|---|---|
| 1. Charge voltage | 0-40 KV | Best performance at highest voltage |
| 2. Beam Current Density | 0.1-10 A/cm$^2$ | Laser output under all conditions |
| 3. Charging time | 0.1-10 $\mu$sec | No significant variation in performance |
| 4. Gas Mixture | $F_2$ 0-25 Torr<br>Kr 0-200 Torr<br>Ar 0-1500 Torr<br>He 0-1500 Torr<br>Xe 0-10 Torr<br>HCl 0-5 Torr | Used in various combinations for tests or KrF, ArF, XeF, XeCl lasers. Optima for KrF with Ar buffer shown in FIG. 10. Similar optima found for other laser gases. |
| 5. Beam Current reset time | 10-90%, 50 nsec<br>10-90%, 100 nsec | No significant variation |
| 6. Electrode Contour | Open mesh screen, No significant variation<br>0.5 cm gap "Fish bone" | |
| 7. Electrode Polarity | screen - anode cathode | No significant variation |
| 8. Optical Cavity | Output reflector 30-70%, Internal mirrors, Injection locked | Performance as expected for optical cavity |

TABLE 1-continued

| Parameter | Range of Variation | Results and Comments |
| --- | --- | --- |
| 9. Fast transfer loop | Barium titinate capacitor Cu: glass stripline High inductance mica | J optimal, stripline performance good, High inductance high capacity tends to arc. |

What is claimed is:

1. A method for repetitive, fast electrical discharge switching of a laser gas, the method comprising the steps of:

providing a gas discharge volume, defined by a container having two electrodes on opposite sides of the container with an electrode gap of at least 1 cm, with a line between the centers of the two electrodes defining a first predetermined direction within the discharge volume;

providing a rare gas/halogen gas mixture as the laser gas, having an associated static self breakdown voltage $V_{dc}$ and an associated transient pulse breakdown voltage $V_{\Delta t}$ for application of a substantially static voltage over any time interval $\Delta t$, in the discharge volume;

applying a substantially spatially uniform, pulsed electric field of increasing magnitude between the two electrodes over a time interval $\Delta t_1$ lying between 1 microsecond and 1 millisecond across the laser gas in the discharge volume, with a maximum associated electric field voltage lying above $V_{dc}$, but below the transient pulse breakdown voltage $V_{\Delta t_1}$ for the laser gas; and propagating an electron beam pulse across the laser gas in the predetermined direction in the gas discharge volume, after application of the pulsed electric field, and after the pulsed electric field has substantially reached its maximum value, with the electron beam having current density substantially 0.1–1.0 amps/cm² and pulse duration $\Delta t_2 \geq 10$ nanoseconds, whereby current flows between the electrodes, and an electrical discharge suitable for laser excitation is excited in the laser gas.

2. A method according to claim 1, further including the step of flowing said laser gas across said discharge volume in a direction substantially transverse to said direction of said substantially uniform pulsed electric field.

3. A method according to claim 1, further including the step of flowing said laser gas across said discharge volume in a direction substantially transverse to said direction of travel of said electron beam pulse.

4. Apparatus for repetitive, fast electrical discharge switching of a rare gas/halogen gas mixture as a laser gas, the apparatus comprising:

a gas discharge volume, defined by a container having two electrodes positioned on opposite sides of the container with an electrode gap of at least 1 cm;

a low inductance electrical energy storage and discharge network, including an electrical energy storage circuit that allows voltage increases of up to 40 kilovolts in a time interval $\Delta t_1$ lying between 1 microsecond and 1 millisecond, and including an electrical discharge circuit electrically connected with the electrodes in the gas discharge volume, and operatively associated with the electrical energy storage circuit, that allows discharge of the energy stored in the storage circuit across the two electrodes in a time interval $\Delta t_2 < 40$ nanoseconds;

a time-varying source of voltage, electrically connected to the two electrodes, that allows a substantially uniform electric field of at least 20 kilovolts/cm to be imposed across the electrode gap in a time interval of the order of $\Delta t_1$; and electron beam means for passing an electron beam having current density $J_b$ substantially 0.1–1.0 amps/cm² and pulse duration $\Delta t \geq 10$ nanoseconds across the laser gas, from one side of the container to the opposite side.

5. Apparatus according to the claim 4, further including gas flow means for impressing a subsonic flow of said laser gas through said discharge volume.

6. Apparatus according to claim 4, wherein said laser gas includes a high pressure ($p \geq 500$ torr) buffer gas drawn from the group consisting of helium, neon, argon, krypton and xenon.

7. Apparatus according to claim 4, wherein said laser gas includes 0.33–1.0% $F_2$.

8. Apparatus according to claim 4, wherein said electrical energy storage circuit comprises a first circuit having a first capacitor and a second capacitor in series with a switch, and said electrical discharge circuit comprises a second adjacent circuit having the first capacitor in series with said two discharge volume electrodes.

* * * * *